C. H. DRAPER.
SPEEDOMETER.
APPLICATION FILED JUNE 12, 1908.
908,079.
Patented Dec. 29, 1908.
2 SHEETS—SHEET 1.
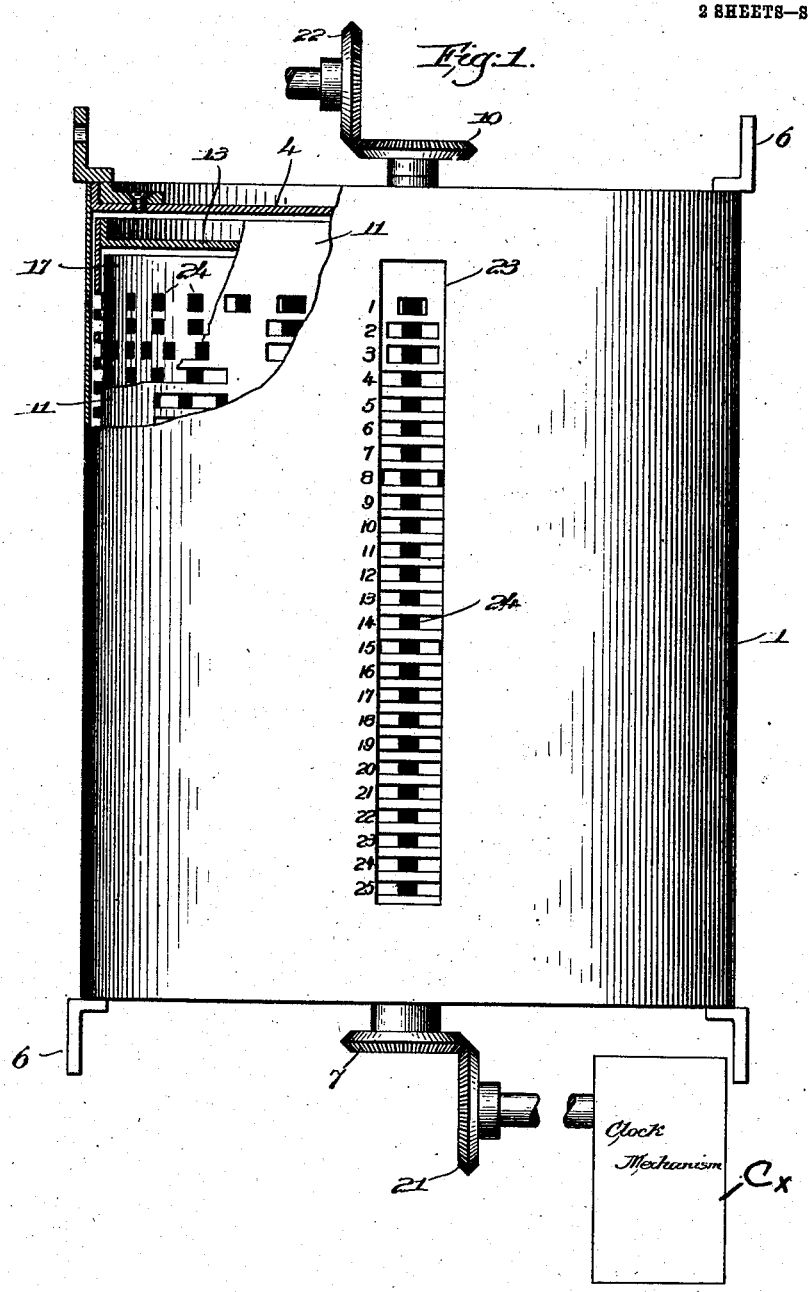

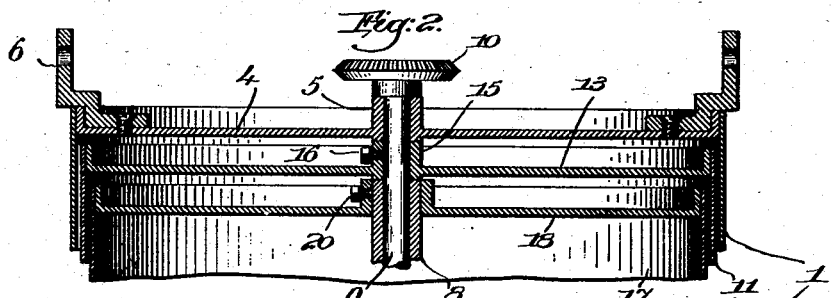

UNITED STATES PATENT OFFICE.

CLARE H. DRAPER, OF HOPEDALE, MASSACHUSETTS.

SPEEDOMETER.

No. 908,079.　　　　Specification of Letters Patent.　　　　Patented Dec. 29, 1908.

Application filed June 12, 1908. Serial No. 438,106.

*To all whom it may concern:*

Be it known that I, CLARE H. DRAPER, a citizen of the United States, and resident of Hopedale, county of Worcester, State of Massachusetts, have invented an Improvement in Speedometers, of which the following description, in connection with the accompanying drawing, is a specification, like letters on the drawing representing like parts.

This invention has for its object the production of a novel apparatus for measuring and indicating the speed at which a moving object is traveling, such, for instance, as an automobile, though my novel speedometer is not by any means restricted to such use.

Speed is measured by the distance traveled in a given period of time, and in all speedometers with which I am familiar the operation depends upon the distance and some factor other than time, such as centrifugal force, the head of a liquid, etc., while it has been my object to devise a speedometer depending on the two factors of distance and time.

Time is ordinarily measured by a clock mechanism or time movement of any suitable character, and distance by the revolutions of a wheel of given circumference. In my present invention I combine these with optical illusion to indicate speed in a manner which must be accurate so long as the clock mechanism, escapement, or time movement (whichever term be used) is regulated properly, and the wheel is of proper circumference and acts without slipping.

So far as the optical illusion is concerned it is based on the following well - known facts, to wit:—When a succession of similar and moving images are presented to the eye in the same position, if the intervals of time between such presentations are short enough the several images appear to the eye as a single stationary image. Also, if the images are presented in successively varying positions the resulting image appears to be in motion from the position first seen to that last seen, the zoetrope and kinetoscope being forms of apparatus operating on this principle.

Conceive a cylinder with a given number of spots, say ten, arranged around its circumference at equal distances apart in a plane at right angles to its axis, and a concentric sleeve revoluble about the axis of the cylinder and having ten openings corresponding in position to the ten spots. Looking at a spot through one of the openings let the cylinder and sleeve revolve at the same speed but in opposite directions. When the second opening takes the place of the first one the second spot will occupy the position of the first spot, and the appearance to the eye is unchanged.

If the interval of time elapsing between the changes in the positions of the spots and openings is short enough the eye has apparently observed but one stationary spot, no movement of the spots being apparent. Now suppose the sleeve to have but one opening, and to revolve ten times as fast as the cylinder, then every time the opening comes to a given position in front of the eye one of the ten spots will be visible, (if at the start a spot was thus visible), and again no motion of the spot will be observed by the eye.

If the sleeve, or shutter, as it will be termed, should revolve a little faster or a little slower than ten times as fast as the cylinder the spots would arrive at a given point opposite the eye a little later or a little earlier in comparison, and consequently would appear to be moving in the direction of rotation of the shutter, or in the direction of rotation of the cylinder, according to the movement of the former faster or slower than ten times as fast as the cylinder.

From the foregoing it will be manifest that a stationary appearance of the spots indicates a relative speed or ratio of 1 to 1, or 10 to 1, depending upon whether the shutter has ten openings or one opening.

The number of spots divided by the number of shutter openings gives the ratio of speed as shown by apparently stationary spots.

In my invention I make use of the optical illusion that a moving series of separate and distinct spots or images are observed in such manner that they appear to the eye to be one and the same stationary spot.

In the practical embodiment of my invention herein illustrated the images or spots are located on a cylinder which is rotated at a constant speed, say one revolution per second, by any suitable clock mechanism or time movement, and the coöperating member or shutter is so geared as to be revolved (by the wheel of an automobile) once per second if the car is traveling at the rate of one mile an hour. Consequently a moving row of spots revealed by an equal number of moving shutter openings will appear to the eye at a given place as one stationary spot, when the speed of the car is one mile per hour. If the car travels at ten miles an hour the shutter will be revolved ten times per second, and a row of spots revealed by a row of one tenth the number of openings will appear to the eye as one stationary spot. Similarly, any num- of miles per hour, (within the limits of the speedometer) may be indicated by a proper ratio of shutter openings to the spots which are arranged on the cylinder behind them.

I have discovered by experiment that when one row of spots appears stationary the rows indicating the next higher and the next lower speeds seem to move slowly in opposite directions, thus making it comparatively easy for the eye to pick out the row which appears to be stationary and which indicates the rate of speed.

Rows of spots for indicating speeds quite different from the one indicated ordinarily appear blurred and indistinct, although multiples of the speed indicated sometimes appear stationary, but factors do not. Therefore, in my speedometer the first apparently stationary spot observed, nearest the row indicating the lowest speed, is the one which is indicating the speed of the car at that moment.

If a given spot is observed through a given opening in the shutter-member in a given position, all in the line indicating a certain speed, a different definite spot will be seen through the next opening of the shutter member in exactly the same position as the first spot was seen, thereby giving to the eye the impression that but one spot has been seen in one position, whereas in reality two spots have been observed, the observation and its impression being manifestly an optical illusion.

Figure 1 is a front elevation of a speedometer embodying one practical form of my invention, the outer stationary casing being partly broken out to show a portion of the revoluble shutter, which latter is also broken out to show the inclosed revoluble image member or cylinder; Fig. 2 is a vertical diametral section of the apparatus shown in Fig. 1, and centrally broken out to save space; Fig. 3 is a development of the shutter; Fig. 4 is a similar development of the surface of the image member.

In the embodiment of my invention herein shown I provide an upright cylindrical case 1 having an attached bottom 2, Fig. 2, with a central tubular boss 3, a top 4 having a central tubular boss 5 being suitably secured in the upper end of the casing, brackets 6 being suitably mounted on the top and bottom of the casing to enable the latter to be attached in fixed position on the automobile in sight of the operator.

A bevel gear 7 is provided with an elongated sleeve-hub 8 rotatably mounted in the boss 3, the hub extending upward to a point near the boss 5, and the shaft 9 of a bevel gear 10 is rotatably mounted in said boss 5, the shaft 9 in practice extending through the length of the sleeve-hub 8 and being freely rotatable therein. The bosses 3 and 5 thus serve as bearings for the revoluble portions of the apparatus, the sleeve-hub 8 and the shaft 9 being shouldered, as shown in Fig. 2, to bear respectively against the outer ends of the bosses 3 and 5.

A cylindrical shutter 11 having attached ends 12, 13, is mounted within the case coaxially therewith, a hub 14 on the end 12 loosely embracing the sleeve-hub 8 while a hub 15 on the end 13 is fixedly secured to the shaft 9 by a set-screw 16, Fig. 2, the hubs abutting against the inner ends of the bosses 3 and 5, as shown.

Within the shutter and concentric therewith a cylindrical image member 17 is mounted, hubs on its upper and lower ends 18, 19 being fixedly secured to the sleeve-hub 8 by suitable set-screws 20, the hubs of the image member 17 abutting against the inner ends of the hubs 14 and 15 of the shutter, and by an inspection of Fig. 2 it will be seen that the arrangement of the parts is such that no endwise movement is permitted with relation to the case 1. Rotation of the shaft 9 effects rotation of the shutter 11 while rotation of the image member or cylinder 17 is effected by rotation of the gear 7 and its sleeve-hub 8.

By means of a bevel gear 21, Fig. 1, suitably connected with any suitable form of clock mechanism or time movement, indicated in Fig. 1, at $C^x$ the image member is revolved at a constant predetermined speed, and by a bevel gear 22 meshing with the gear 10 and connected in any suitable manner with one of the wheels of the automobile the shutter 11 is driven at a variable speed according to the speed attained by the vehicle.

In practice I drive the image member 17 at the rate of one revolution per second and the shutter member 11 at the same speed when the vehicle speed is one mile per hour, so that the R. P. M. (revolutions per minute) will be in the same ratio to the number of minutes as the R. P. M. of the shutter is to the number of miles per hour, the shutter being so geared to the vehicle wheel that the number of revolutions per minute of the shutter correspond relatively to the miles per hour. That is, at one mile per hour the image member will make sixty revolutions in one minute, and the shutter will be rotated at the same speed, but oppositely to the image member, giving the equation $$60:1 = R.P.M.$$

of image member to $$1 \text{ minute} = 60:1 = R.P.M.$$

to one mile per hour. For a speed of ten miles per hour we have $$60:1::600:10,$$

the shutter being rotated at ten times the former speed, and so on for other speeds.

As shown in Fig. 1 the case 1 is provided with a longitudinal slot or sight opening 23 on the side nearest the observer, and adjacent this sight opening at one side thereof I place a vertical row of index numbers, in this instance running from 1 to 25, in regular order. These index numbers indicate, in a manner to be explained, the rate of speed at which the vehicle is running.

The cylindrical surface of the image member 17 is provided with twenty-five circular series of images, herein shown as rectangular spots, and preferably of like dimensions throughout, the vertical spacing of the series corresponding to the spacing of the index numbers on the case.

An inspection of the developed surface of the image member, Fig. 4, will make clear the relative arrangement and number of spots or images in the twenty-five series, it being understood that this arrangement is based upon the previously explained speed ratios, etc., of the moving parts of the apparatus.

Any spot or image is indicated at 24.

The shutter is provided with openings arranged in circular series, and each opening is of a vertical dimension substantially corresponding to the height of an image, all of the shutter openings thus being of the same height, but they vary in width, as will be apparent from an inspection of Fig. 3. Now with a single shutter opening the number of images in a given series on the image member 17 would be equal to the number of miles indicated but with more than one shutter opening for a given series of images the number of miles indicated would be equal to the number of images in the proper series divided by the number of shutter openings corresponding. For example, in the present apparatus, at a speed of 25 miles per hour the shutter 11 will revolve 25 times as fast as the image member 17, and I have shown 50 images or spots in the lowermost series on said member 17, while the shutter 11 has but two openings 25, Fig. 3, corresponding to that series of images. Hence the number of images 50, divided by 2, gives 25, the number of miles per hour.

Taking the uppermost series of images, 32 are shown in Fig. 4, and the same number of shutter openings is shown at 26, Fig. 3, the former when divided by the latter giving 1, the number of miles per hour. That is, at one mile per hour the image member 17 and the shutter 11 are revolved oppositely but at the same speed, and as a result the observer looking at the sight opening 23 of the casing will see at the top what appears to be a single, stationary image opposite the index number 1, while the other images will appear to move and will be blurred or indistinct. If the speed increases to 25 miles per hour, the apparently stationary image will appear to the observer opposite the index number 25 on the case, viewing Fig. 1, while all the other images will appear to be in motion. In like manner, for any intermediate speed the stationary image will appear opposite the index number corresponding to that speed, while the other images will be in motion and blurred.

At a speed intermediate any indexed speed the images corresponding to the next speeds above and below will appear to the observer to move slowly in opposite directions. For example, if the observer notes that the series of images corresponding to the index number 15 is moving slowly in one direction and the series of images corresponding to the index number 16 is moving slowly in the opposite direction he knows that the speed is between 15 and 16 miles per hour.

The second and third rows of shutter openings 27 are the same in number, sixteen, while the second series of images numbers thirty-two, and the third series forty-eight, giving speeds respectively of two and three miles per hour.

Rows four to eight, inclusive, of shutter openings, indicated on Fig. 3 by the reference number 28, are each made up of eight openings, and the number of images in any corresponding series is equal to the number of miles for that series multiplied by 8. Then come seven rows of openings 29, Fig. 3, with four shutter openings in each row, the number of images in a given corresponding series being equal to the number of miles indicated by that series multiplied by 4.

From the foregoing description of the apparatus its mode of operation will be clear, and its theory of operation evident. The images may be of any desired shape and as herein shown they are rectangular spots.

In actual practice I find it is desirable to make the outer surface of the shutter black, and also to make the images red or white on a black background on the image member.

Having designed the apparatus for use with a vehicle wheel of a given diameter it is applicable to vehicles having wheels of different diameters by a simple change in the intermediate gearing so as to operate as hereinbefore set forth.

My invention is not restricted to the arrangement and proportions herein illustrated for the shutter openings, nor for the images, for it will be obvious that I have shown for illustrative purposes but one practical embodiment of my invention.

Variations in details of construction and arrangement may be made, accordingly, by those skilled in the art without departing from the spirit and scope of my invention as set forth in the annexed claims.

Having fully described my invention, what I claim as new and desire to secure by Letters Patent is:—

1. In a device for measuring speed, a member moved at constant speed, means to move it, a second member, means to move it by the object whose speed is to be measured and at a variable speed determined by the speed of such object, said members being provided with means to present to the eye of the observer, when said members are in motion, an apparently stationary image in any one of a series of different positions according to the relative speeds of rotation of said members.

2. In a device for measuring speed, a member rotated at constant speed and having a plurality of images thereon, means to rotate said member, a second member, means to rotate it by the object whose speed is to be measured and at a speed determined by the speed of such object, said second member being concentric with the image member and having series of openings therein through which the series of images may be seen, the images and openings of corresponding series being so related that at one speed of the object an image of a particular series will appear to be at rest, and at another speed an image of a different series will appear to be at rest.

3. In a device for measuring speed, a rotatable shutter having series of openings, means to rotate the shutter by the object the speed of which is to be measured, an image member behind the shutter and oppositely rotated at a constant speed, and means to rotate the image member, said member having series of images thereon temporarily visible through the openings in the shutter, the images being in the same ratio to the corresponding shutter openings as the ratio of the speeds to be indicated is to unity, whereby at such ratio of speeds the images of a series indicative of a certain speed will appear stationary through the shutter openings.

4. In a device for measuring speed, a shaft rotated at constant speed, means to rotate it, a shaft adapted to be rotated at a rate in accordance with the speed of the object the speed of which is to be measured, and means operated by said shafts and dependent upon optical illusion for the impression produced upon the eye of the observer to indicate the ratio between the speeds of the two shafts.

5. In a device for measuring speed, a member rotated at a constant speed, means to rotate said member, a second member, means to rotate it by the object whose speed is to be measured and at a speed determined by the speed of such object, said members being concentric, one of the members having a plurality of images thereon and the other member having series of openings therein through which the series of images may be seen, the images and openings of corresponding series being so related that at one speed of the object an image of a particular series will appear to be at rest, and at another speed an image of a different series will appear to be at rest.

6. A device for measuring speed, including an image member, a member having openings through which the images can at times be seen, means to move one of said members at constant speed and, means to move the other member according to the speed of the object whose speed is to be measured, to indicate the relative speed of said members by the substantially stationary appearance of the images as seen through the member having openings therein.

7. In a speedometer, a rotatable member having a plurality of series of images thereon, a shutter member in front of it and having series of openings through which the images can at times be seen, means to rotate one of said members at a constant speed, and means to rotate oppositely the other member by the object whose speed is to be measured, to indicate the relative speeds of said members by the substantially stationary appearance of the images of a series seen through the coöperating openings in the shutter member.

8. In a speedometer, an image member means to rotate it at a constant speed, a concentric, oppositely rotatable shutter driven at a rate determined by the speed of the object whose speed is to be measured, means by which the shutter is rotated by the object whose speed is to be measured, the image member having a plurality of circular series of images thereon and the shutter having correspondingly arranged series of openings, the number of images and shutter openings of coöperating series being so related that the former divided by the latter equals the corresponding number of speed units per unit of time, and an inclosing case having a sight opening, an apparently stationary image visible in such opening indicating by its position with relation to the ends of the opening the speed of the object.

9. In a speedometer, an image member means to rotate it at a constant speed, a concentric, oppositely rotatable shutter means by which the shutter is rotated by the object whose speed is to be measured at such a rate that the ratio of shutter revolutions per minute to the number of miles per hour equals the revolutions per minute of the image member to the number of minutes, whereby at any speed of the object the images of one of the series will appear stationary through the corresponding shutter openings, a stationary inclosing case for said shutter and image member, having a sight opening, and a series of index numbers at one side of the opening, the number opposite the apparently stationary image denoting the speed in miles per hour.

10. In a speedometer, an image member means to rotate it at a constant speed, a concentric, oppositely rotatable shutter, means by which the shutter is rotated by the object whose speed is to be measured at such a rate that the ratio of shutter revolutions per minute to the number of miles per hour equals the revolutions per minute of the image member to the number of minutes, whereby at any speed of the object the images of one of the series will appear stationary through the corresponding shutter openings, and a stationary inclosing case for the shutter and image member, having a sight opening crossing all the series of images, through which opening the indications of the speedometer are visible to the observer.

11. In a speed-measuring device for vehicles, an image member rotated at a constant speed and having a plurality of circular series of images arranged thereon corresponding to different speeds per hour, means to rotate said member a shutter concentric with and adjacent to said image member means by which the shutter is rotated oppositely thereto by one of the vehicle wheels at a number of revolutions per minute bearing a fixed relation to the miles per hour at which the vehicle is traveling, the revolutions per minute of the image member to the number of minutes having the same ratio as the revolutions of the shutter per minute to the miles per hour, said shutter having a plurality of series of openings corresponding to the series of images, whereby at a given speed the images of the corresponding series will appear substantially stationary, and a non-rotating case inclosing the shutter and image member and having an elongated, relatively narrow sight opening through which the images may be observed.

12. In a speed-measuring device for vehicles, a cylindrical image member rotated at a constant speed and having a plurality of circular series of images arranged thereon corresponding to different speeds per hour, means to rotate said member a shutter concentric with and inclosing said image member, means by which the shutter is rotated oppositely thereto by one of the vehicle wheels at a rate governed by the speed of the vehicle, the revolutions per minute of the image member to the number of minutes having the same ratio as the revolutions of the shutter per minute to the miles per hour, said shutter having a plurality of series of openings corresponding to the series of images, whereby at a given speed the corresponding series of images will appear substantially stationary, and a non-rotating case inclosing the image member and shutter and having a longitudinal sight opening through which the images may be observed.

In testimony whereof, I have signed my name to this specification, in the presence of two subscribing witnesses.

CLARE H. DRAPER.

Witnesses:
EDWARD F. ALLEN,
FREDERICK S. GREENLEAF.